(12) United States Patent
Nguyen et al.

(10) Patent No.: US 7,857,383 B2
(45) Date of Patent: Dec. 28, 2010

(54) SOFT COVER FOR COVERING A SEAT

(75) Inventors: Thanh P. Nguyen, Novi, MI (US);
Tomonari Yoshida, Novi, MI (US)

(73) Assignee: YKK Corporation, Tokyo (JP)

( * ) Notice: Subject to any disclaimer, the term of this patent is extended or adjusted under 35 U.S.C. 154(b) by 134 days.

(21) Appl. No.: 12/332,861

(22) Filed: Dec. 11, 2008

(65) Prior Publication Data
US 2010/0148551 A1    Jun. 17, 2010

(51) Int. Cl.
*A47C 31/02*    (2006.01)

(52) U.S. Cl. .............................. 297/218.1; 297/228.13; 297/452.38

(58) Field of Classification Search ............. 297/218.1, 297/218.5, 228.13, 452.38
See application file for complete search history.

(56) References Cited

U.S. PATENT DOCUMENTS

| | | | | |
|---|---|---|---|---|
| 3,981,534 A | * | 9/1976 | Wilton ..................... | 297/218.1 |
| 4,065,181 A | * | 12/1977 | Gunlock et al. ........ | 297/440.22 |
| 4,643,480 A | * | 2/1987 | Morita .................. | 297/452.38 |
| 4,832,400 A | * | 5/1989 | Aoki et al. ............... | 297/284.4 |
| 5,295,732 A | * | 3/1994 | Boisset .................... | 297/452.1 |
| 5,718,478 A | * | 2/1998 | Allison .................... | 297/344.1 |
| 5,826,939 A | * | 10/1998 | Beyer ...................... | 297/218.3 |
| 5,954,395 A | * | 9/1999 | Moulins et al. .......... | 297/218.4 |
| 6,076,888 A | * | 6/2000 | Turletti .................... | 297/218.3 |
| 7,673,939 B2 | * | 3/2010 | Taguchi et al. ........... | 297/218.1 |
| 2002/0117882 A1 | * | 8/2002 | Takezawa ................ | 297/218.1 |

FOREIGN PATENT DOCUMENTS

| | | |
|---|---|---|
| JP | B2-55-37245 | 9/1980 |
| JP | A-08-228885 | 9/1996 |
| JP | A-2003-24187 | 1/2003 |

* cited by examiner

*Primary Examiner*—Peter R. Brown
(74) *Attorney, Agent, or Firm*—Alston & Bird LLP

(57) ABSTRACT

Various embodiments of the invention provide a soft cover for covering a seat having an inner frame. According to various embodiments, the soft cover includes a rear portion having a first side portion, a second side portion, an upper portion, and a flap portion with a medial portion. In various embodiments, the medial portion of the soft cover is configured to be recessed by engaging hooks that are attached to the inner surface of the medial portion to the inner frame of the seat and engaging fasteners along the edges of the flap portion with corresponding fasteners along the first and second side portions of the rear portion.

13 Claims, 8 Drawing Sheets

SOFT COVER FOR COVERING A SEAT

BACKGROUND OF THE INVENTION

Figure 1:
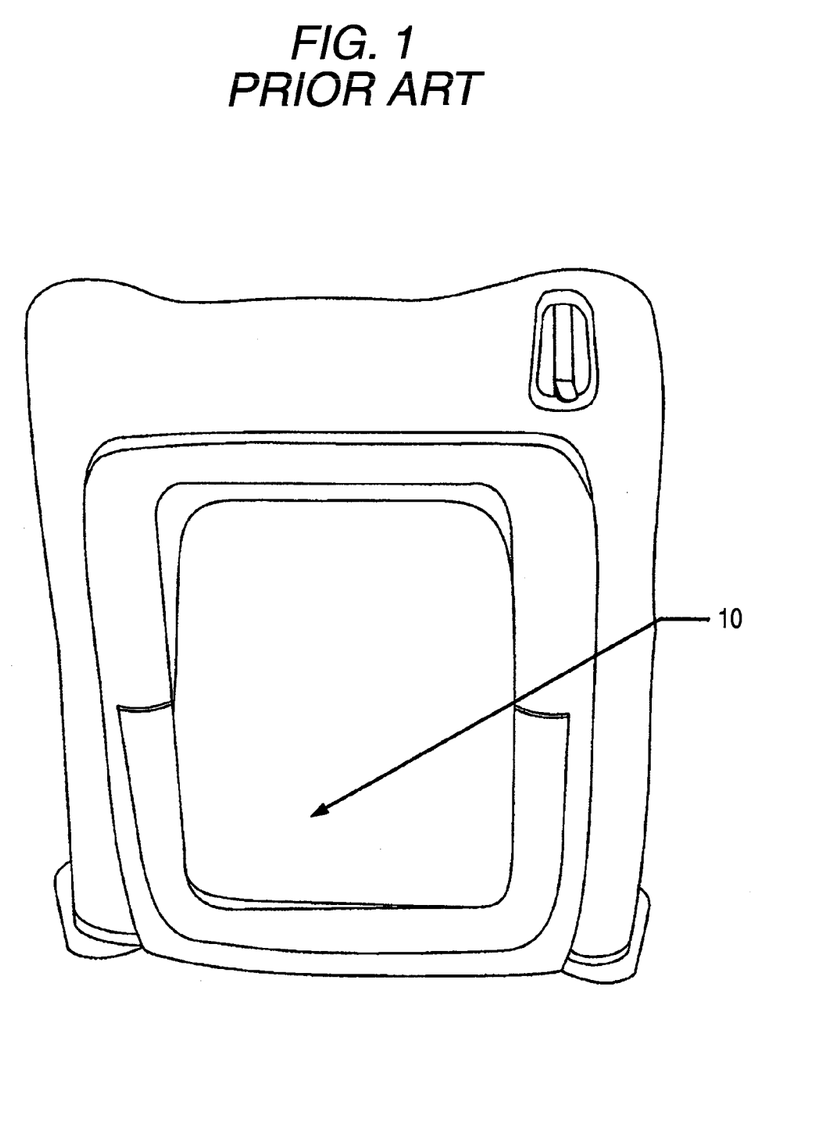
FIG. 1 illustrates a plan view of a removable hard back panel used with a seat cover for the seat of an automobile according to the prior art.

A conventional seat cover used for an automobile seat is typically constructed using a removable hard back panel 10, as shown in FIG. 1. Such construction allows for a portion of the back portion of the automobile seat to be recessed. This recessed portion provides additional knee clearance for a passenger getting in and out of the automobile behind the seat, as well as additional knee clearance while the passenger is riding behind the seat. In addition, the hard back panel is removable to provide access to the seat side airbag that is located inside the seats of many automobiles.

However, the use of the removable hard panel 10 is costly and adds weight to the seat assembly. Therefore, a need exists in the art for a seat cover that eliminates the hard back panel and still provides knee clearance (e.g., a recessed back portion) and access to the seat side airbag.

BRIEF SUMMARY OF THE VARIOUS EMBODIMENTS OF THE INVENTION

According to various embodiments of the invention, a soft cover is provided for covering a seat having an inner frame. For example, the cover may be for a passenger seat in an automobile. The soft cover includes a rear portion having a first side portion, a second side portion, an upper portion, and a flap portion. The first side portion includes an inner edge having a first set of one or more fasteners disposed thereon, and the second side portion includes an inner edge having a second set of one or more fasteners disposed thereon. The upper portion is disposed between the first side portion and the second side portion. In addition, the flap portion is disposed between the first side portion and the second side portion and below the upper portion.

According to various embodiments, the flap portion includes a first flap portion edge adjacent to the inner edge of the first side portion, a second flap portion edge adjacent to the inner edge of the second side portion, and an upper flap portion edge extending between upper ends of the first and second flap portion edges. In addition, the first flap portion edge has a first set of one or more mating fasteners disposed thereon that is configured to engage the first set of one or more fasteners on the first side portion, and the second flap portion edge has a second set of one or more mating fasteners disposed thereon that is configured to engage the second set of one or more fasteners on the second side portion.

Furthermore, the flap portion includes a medial portion disposed between the first and second flap portion edges. The medial portion includes a first medial portion edge, a second medial portion edge, and an upper medial portion edge. The first medial portion edge is adjacent and spaced apart from the first flap portion edge, and the second medial portion edge is adjacent and spaced apart from the second flap portion edge. The upper medial portion edge extends between upper ends of the first medial portion edge and the second medial portion edge.

The flap portion further includes an inner surface that is configured to face the seat frame when the seat cover is installed over the seat frame. A first set of one or more hooks are secured to the inner surface of the medial portion along the first medial portion edge, and a second set of one or more hooks are secured to the inner surface of the medial portion along the second medial portion edge. These sets of one or more hooks are configured to engage the inner frame of the seat.

The medial portion is configured to be recessed relative to a plane extending through the first and second side portions and the upper portion by: (1) engaging the first and second sets of hooks with the inner frame of the seat; (2) engaging the first set of one or more fasteners disposed on the first side portion with the first set of one or more mating fasteners disposed on the first flap portion edge; and (3) engaging the second set of one or more fasteners disposed on the second side portion with the second set of one or more mating fasteners disposed on the second flap portion edge.

According to one embodiment of the invention, the first set of one or more hooks is a first elongated J-hook, and the second set of one or more hooks is a second elongated J-hook. In addition, the first and second set of one or more fasteners and the first and second set of one or more mating fasteners include first and second slide fasteners, respectively. In a particular embodiment, the slide fasteners are concealed slide fasteners.

BRIEF DESCRIPTION OF THE DRAWINGS

Having thus described various embodiments of the invention in general terms, reference will now be made to the accompanying drawings, which are not necessarily drawn to scale, and wherein:

DETAILED DESCRIPTION OF VARIOUS EMBODIMENTS OF THE INVENTION

Various embodiments of the invention are described more fully hereinafter with reference to the accompanying drawings, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

Brief Summary

Various embodiments of the invention provide a soft cover for covering a seat having an inner frame. According to various embodiments, the soft cover includes a rear portion having a first side portion, a second side portion, an upper portion, and a flap portion. The flap portion includes a medial portion, and the medial portion is configured to be recessed relative to the first and second side portions and the upper portion by engaging hooks that are attached to the inner surface of the medial portion to the inner frame of the seat and engaging fasteners along the side edges of the flap portion with corresponding fasteners along the first and second side portions of the rear portion.

Elements of the Soft Cover

Figure 2:
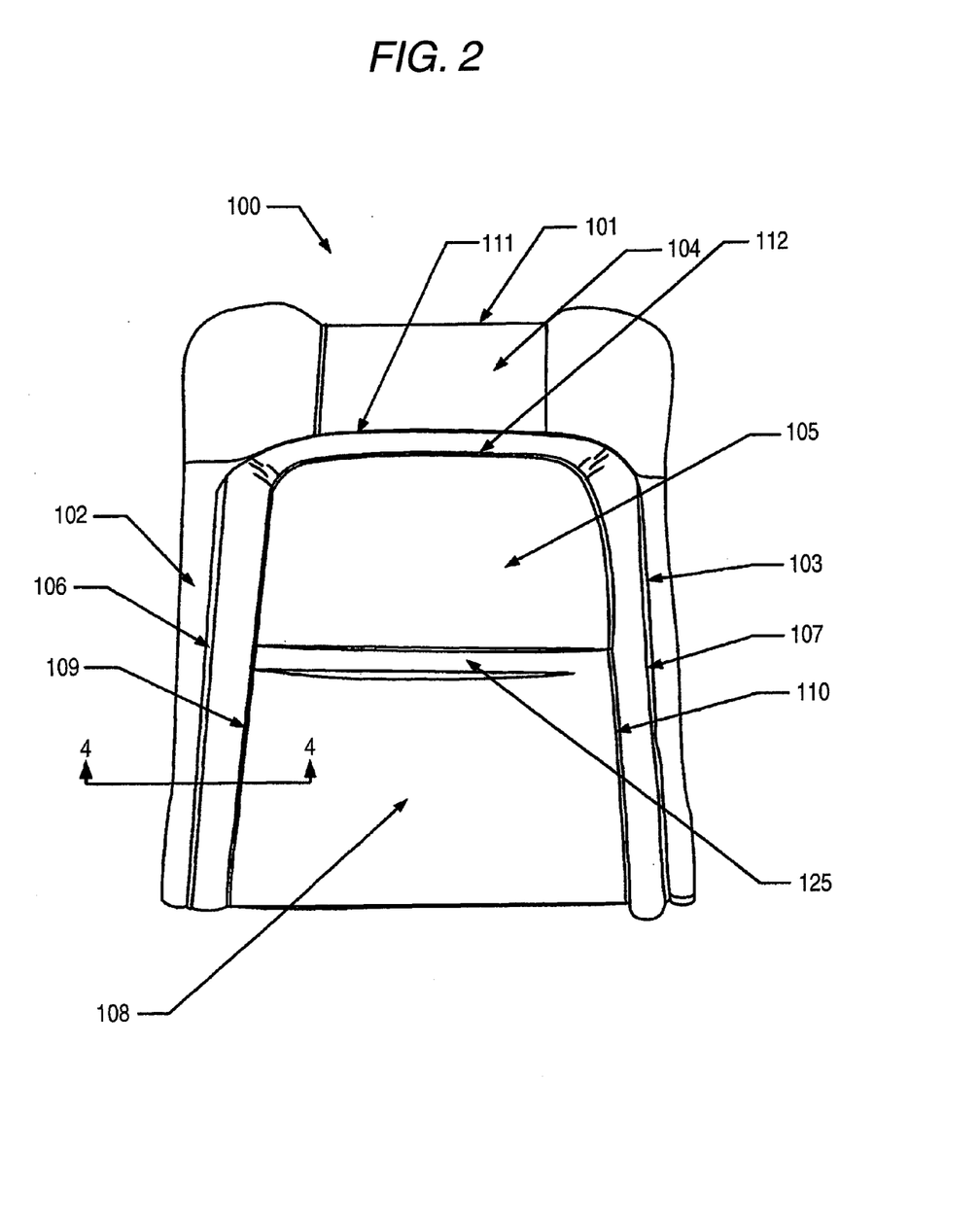
FIG. 2 illustrates a plan view of a rear portion of a soft cover according to one embodiment of the invention.

FIG. 2 shows a rear portion 101 of a soft cover 100 according to various embodiments of the invention. The soft cover 100 is used to cover a seat having an inner frame, and the soft cover 100 may be made of seat trim material, for example, vinyl, fabric, suede, leather or perforated leather.

In general, the rear portion 101 of the soft cover 100 shown in FIG. 2 includes a first side portion 102, a second side portion 103, an upper portion 104, and a flap portion 105. The upper portion 104 is disposed between the first side portion 102 and the second side portion 103. In addition, the flap portion 105 is disposed between the first side portion 102 and the second side portion 103 and below the upper portion 104.

The flap portion 105 includes a first flap portion edge 106, a second flap portion edge 107, an upper flap portion edge 111, and a medial portion 108. The first flap portion edge 106 is adjacent and cofaces the inner edge of the first side portion 102, and the second flap portion edge 107 is adjacent and cofaces the inner edge of the second side portion 103. The upper flap portion edge 111 extends between upper ends of the first flap portion edge 106 and the second flap portion edge 107. In addition, the medial portion 108 is disposed between the first flap portion edge 106 and the second flap portion edge 107 and below the upper flap portion edge 111.

In one embodiment, the upper flap portion edge 111 is integrally formed with the upper portion 104. In another embodiment, the flap portion 105 may be separately formed from the first and second side portions 102, 103 and the upper portion 104. The upper flap portion edge 111 may be attached adjacent the upper portion 104 by sewing or using fasteners (e.g., snaps, zippers, hook and loop strips, or other types of suitable fasteners).

The medial portion 108 includes a first medial portion edge 109, a second medial portion edge 110, and an upper medial portion edge 112. The first medial portion edge 109 is adjacent and spaced apart from the first flap portion edge 106, and the second medial portion edge 110 is adjacent and spaced apart from the second flap portion edge 107. In addition, the upper medial portion edge 112 extends between upper ends of the first medial portion edge 109 and the second medial portion edge 110. In various embodiments, an outer surface of the medial portion 108 may also include a pocket 125 for storing items, such as maps, books, or personal items.

The first side portion 102 has an inner edge on which a first set of one or more fasteners are disposed. In addition, the second side portion 103 has an inner edge on which a second set of one or more fasteners are disposed. Furthermore, the first and the second flap portion edges 106, 107 have a first and second set of one or more mating fasteners to mate with the first and second set of one or more fasteners disposed on the first and the second side portions 102, 103, respectfully.

These sets of one or more fasteners may be of various types. In various embodiments, the sets of one or more fasteners are selectively engageable. For example, in various embodiments, the sets of one or more fasteners include one or more slide fasteners. In particular, the first set of one or more fasteners includes a first plurality of teeth disposed on the first side portion 102, and the first set of one or more mating fasteners on the first flap portion edge 106 includes a second plurality of teeth configured for mating with the first plurality of teeth by sliding a slide fastener over the first and second plurality of teeth. In addition, the second set of one or more fasteners includes one or more slide fasteners, wherein the second set of one or more fasteners includes a third plurality of teeth disposed on the second side portion 103, and the second set of one or more mating fasteners on the second flap portion edge 107 includes a fourth plurality of teeth configured for mating with the third plurality of teeth by sliding a slide fastener over the third and fourth plurality of teeth. In a particular embodiment, the slide fastener is a concealed type slide fastener (e.g., YKK CONCEAL, 45ECH), which improves the appearance of the soft cover once it is fully installed.

In another embodiment, the sets of one or more fasteners includes snaps of interlocking discs with the female discs of the snaps being located on the first and the second side portions 102, 103 and the corresponding male discs of the snaps being located on the first and the second flap portion edges 106, 107, or vice versa. In various other embodiments, the fasteners are hook and loop strips, buttons, or a combination of various types of fasteners.

Figure 3:
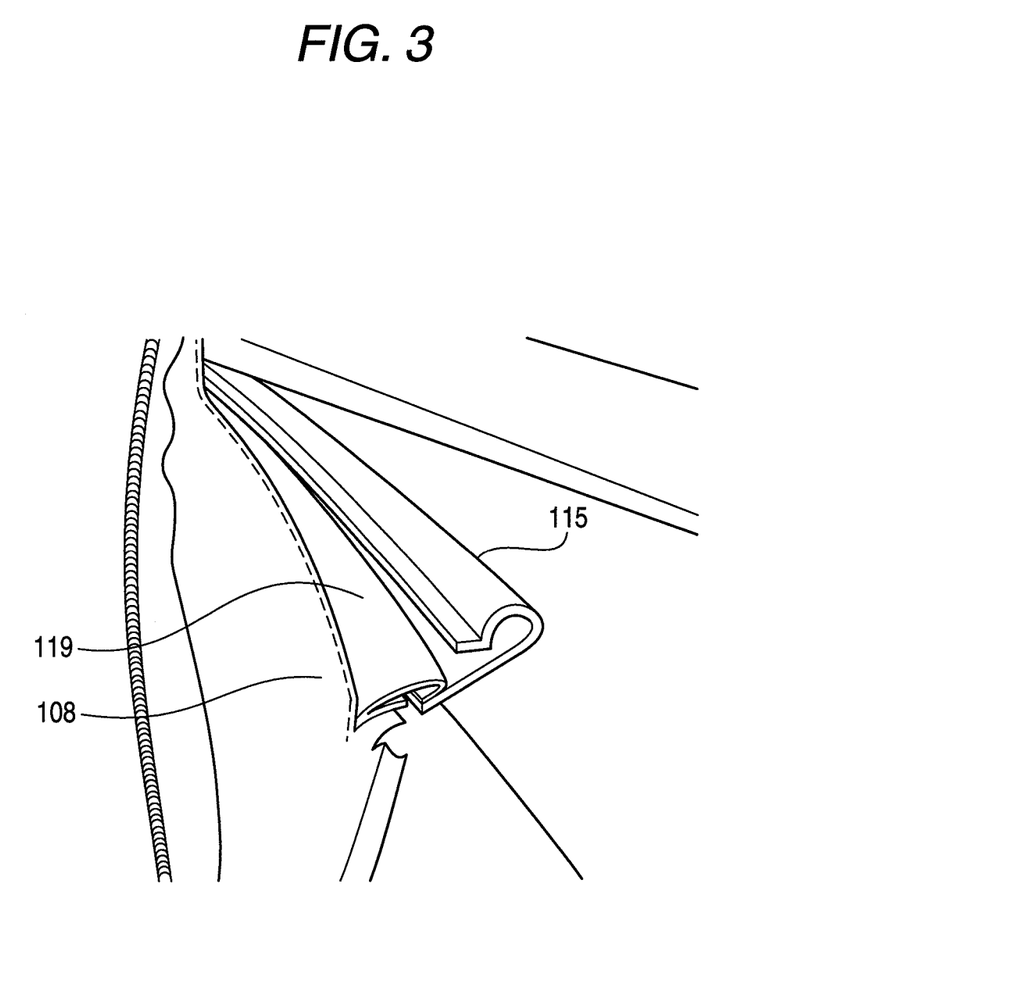
FIG. 3 illustrates an enlarged side view of an elongated J-hook according to one embodiment of the invention.

Furthermore, various embodiments include a first and a second set of one or more hooks secured to the inner surface of the medial portion 108 along the first and second medial portion edges 109, 110, respectively, and these sets of one or more hooks are configured to engage the inner frame of the seat. In one embodiment, the first set of one or more hooks includes a first elongated J-hook, and the second set of one or more hooks includes a second elongated J-hook. An embodiment of an elongated J-hook is shown in FIG. 3 and described below. In another embodiment, the first set of one or more hooks includes a plurality of J-hooks that are spaced apart from each other, and the second set of one or more hooks includes a plurality of J-hooks that are spaced apart from each other. In various other embodiments, the first and second sets of one or more hooks include other types of hooks having various shapes, such as C-hooks, square hooks, or clips. According to various embodiments, the types of hooks used are easily engaged and disengaged with the inner frame of the seat, allowing a user to install and uninstall the flap portion 105 of the soft cover easily.

FIG. 3 illustrates an enlarged view of an elongated J-hook 115. The J-hook 115 defines a channel extending along a longitudinal axis of the hook and has a J-shaped cross section as taken through a plane substantially perpendicular to the longitudinal axis. In the embodiment shown in FIG. 3, one side of the J-hook 115 is sewn to a piece of fabric 119, and the fabric 119 is sewn to the medial portion 108 of the flap portion 105. In other embodiments, the J-hook 115 may be sewn directly to the medial portion 108 of the flap portion 105. In various other embodiments, the J-hook 115 may be fastened adjacent the medial portion 108 using adhesive, staples, welding, or other suitable fastening means.

Figure 8:
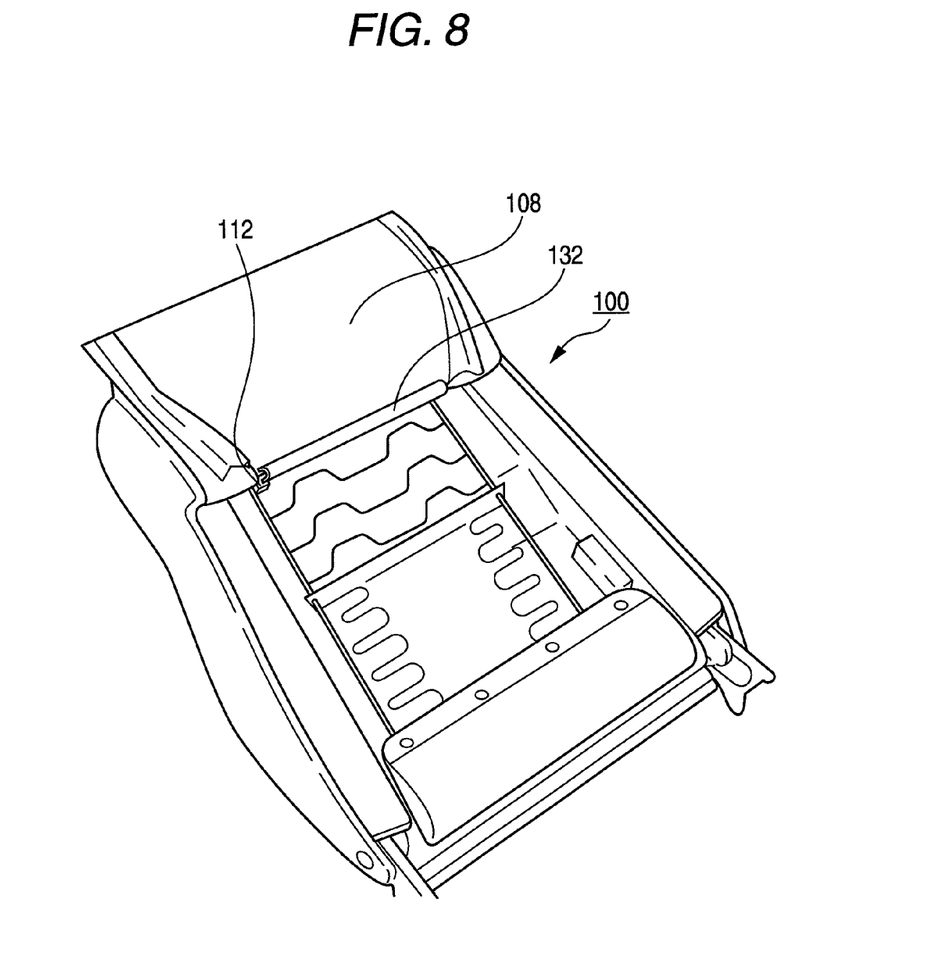
FIG. 8 illustrates a perspective view of an alternative embodiment of the invention.

In an alternative embodiment, such as shown in FIG. 8, a third set of one or more hooks 132 is secured to the inner surface of the medial portion 108 along the upper medial portion edge 112. This third set of one or more hooks 132 is configured to engage the inner frame of the seat adjacent the upper portion 104 of the seat.

Elements of the Seat

The seat cover 100 of various embodiments may be used on several types of seats. For example, the seat may be an automobile seat or a passenger seat used on an airplane, train, or bus.

Figure 4:
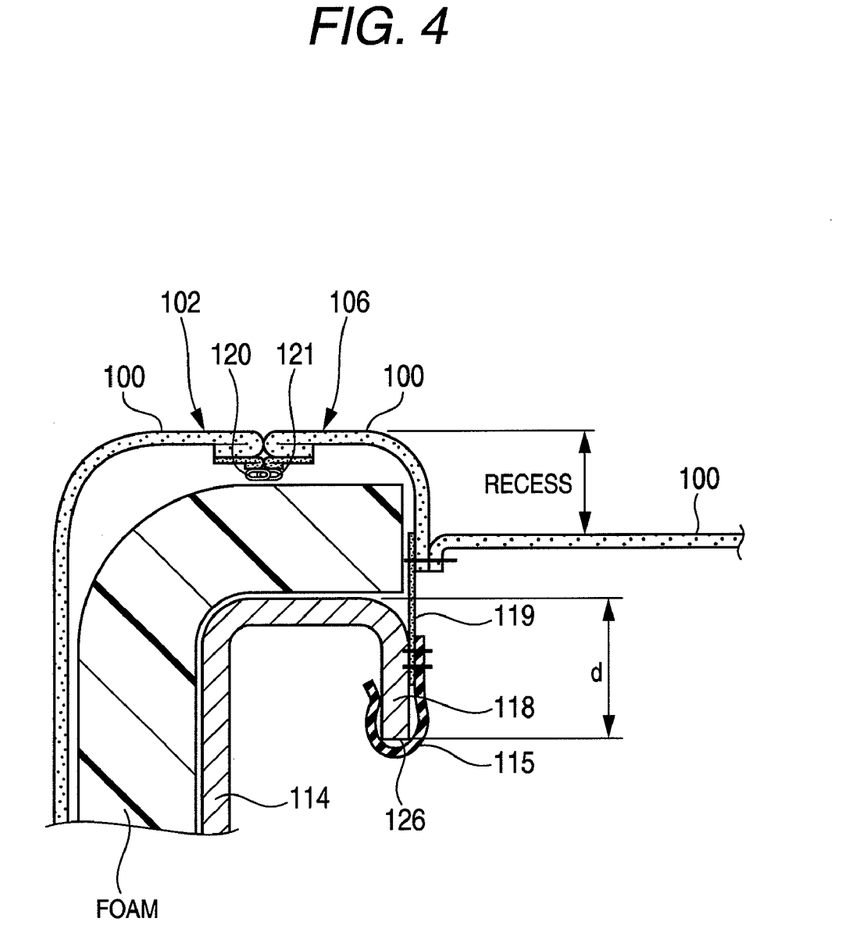
FIG. 4 illustrates a cross-sectional view of the rear portion of the seat cover shown in FIG. 2 as taken along the 4-4 line.

In the embodiment shown in FIG. 4, the seat includes an inner frame 114. The inner frame 114 may be constructed of various materials such as metal, plastic, or composite. Furthermore, the inner frame 114 may be covered with padding to make the seat more comfortable for a person using the seat.

According to one embodiment, a portion of the inner frame 114 of the seat has a J-shaped cross-sectional shape as taken through the 4-4 line of FIG. 2 and as shown in FIG. 4. In particular, the J-shaped portion of the frame 114 includes a lip 118 that faces the interior of the seat. When the hooks are engaged with the inner frame 104, the channel of each hook 115 receives the lip 118 of the frame 114 adjacent to it. The depth that the flap portion 105 is recessed relative to the first and second side portions 102, 103 and upper portion 104 is a function of the depth d from the inner edge of the inner frame 114 (e.g., an inner edge 126 of the lip 118 in the embodiment of FIG. 4) to the outer surface of the frame 114 adjacent the first and second side portions 102, 103 and/or the upper portion 104.

In various other seats, the inner frame 114 may be of different configurations. For example, the frame 114 may include an L-shaped or square shaped portion for engaging the hooks or clips secured adjacent the medial portion 105 of the seat cover. In addition, the inner frame 114 may defines holes through which the hooks 115 engage the frame.

Method of Installation

Figure 5:
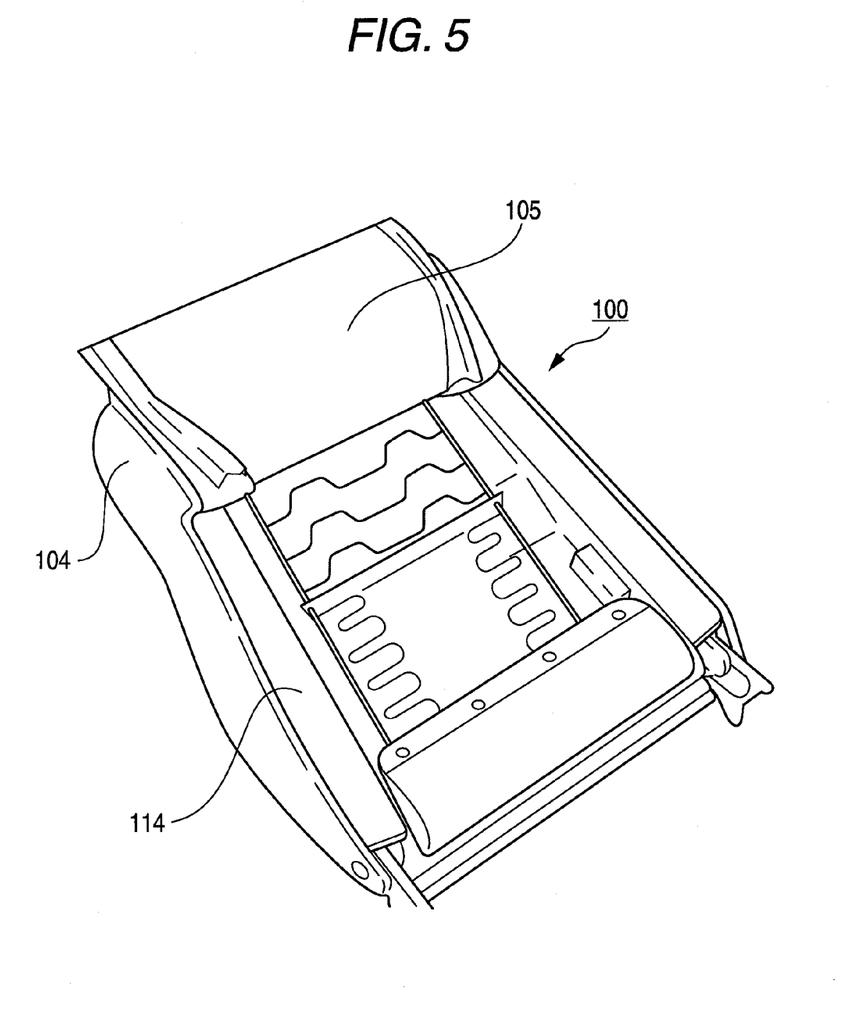
FIG. 5 illustrates a perspective view of the installation of the soft cover shown in FIG. 2.
Figure 6:
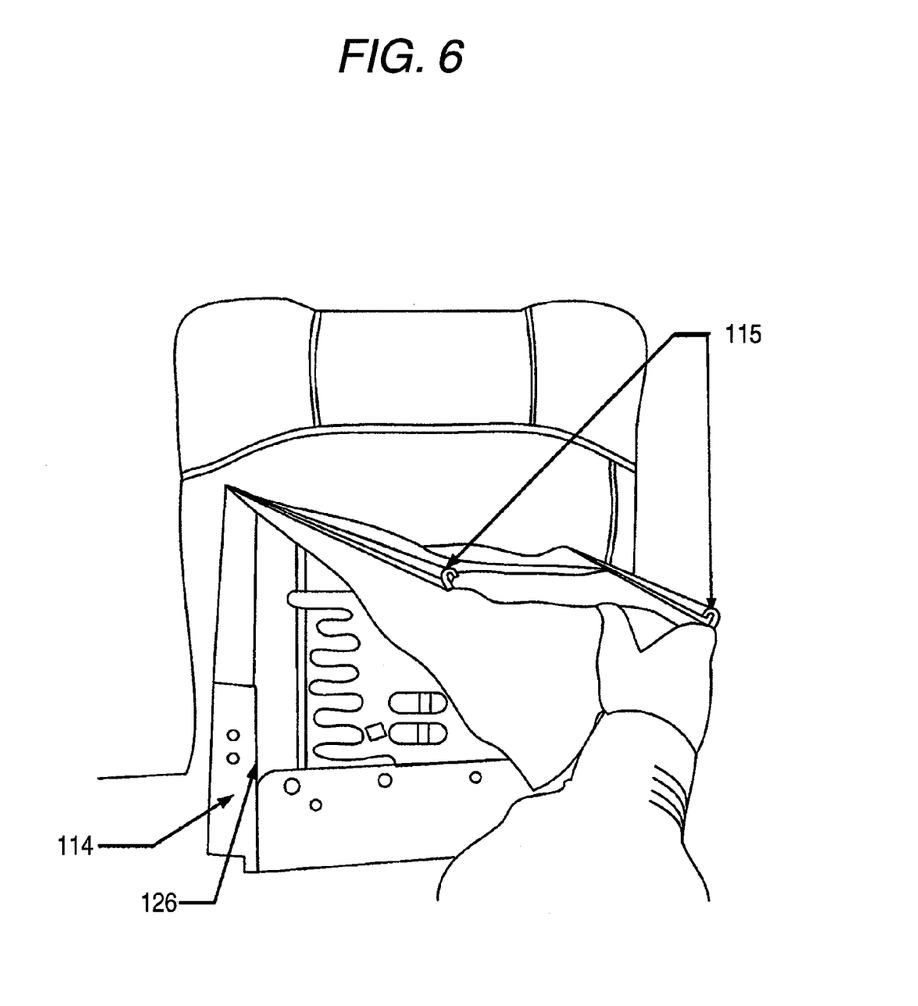
FIG. 6 illustrates a plan view of the installation of the soft cover shown in FIG. 2.

FIGS. 5 and 6 illustrate views of the soft cover 100 being installed on the seat according to various embodiments. Specifically, these figures show the inner frame 114 of the seat partially exposed with the flap portion 105 pivoted upwardly about the upper edge 111 of the flap portion 105 to reveal the inner surface of the flap portion 105.

To install the soft cover 100, according to a first embodiment, the cover 100 is slid over the padding and inner frame 114 such that the inner surface adjacent the padding fits snuggly. Next, the flap portion 105 is attached into place by engaging the first and second hooks 115 with the inner edge 126 of the frame 114. For example, FIG. 5 illustrates one embodiment in which the hook (e.g., elongated J-hook) 115 is engaged with an inner edge 126 of the lip 118 of the J-shaped portion of the inner frame 114. FIG. 6 illustrates the first J-hook 115 to be engaged with a first inner edge 126 of the inner frame 114 and the second J-hook 115 to be engaged with a second inner edge 126 of the inner frame 114. In the alternative embodiment shown in FIG. 8, the third set of hooks 132 are also engaged with the inner edge 126 of the frame 114 to attach the flap portion 105 into place along the upper medial portion edge 112.

After the sets of one or more hooks 115 have been secured to the inner frame 114 of the seat, the first set and the second set of one or more fasteners disposed along the first and the second side portions 102 and 103 are engaged with the corresponding first and second sets of mating one or more fasteners disposed along the first and the second flap portion edges 106, 107, respectively. For example, in the embodiment shown in FIG. 4, the first set of teeth 120 disposed on the inner edge of the first side portion 102 and the first set of mating teeth 121 disposed on the first flap portion edge 106 are engaged by sliding at least one slide fastener over them. Similarly, the second set of teeth disposed on the inner edge of the second side portion 103 and the second set of mating teeth disposed on the second flap portion edge 107 are engaged by sliding at least one slide fastener over them. As a result, the soft cover 100 is secured to the seat. In various embodiments, the fasteners are easily engaged and disengaged to allow easy access to the interior of the seat, which allows an individual access to items located in the seat such as a seat side airbag that is located inside many automobile seats.

Figure 7:
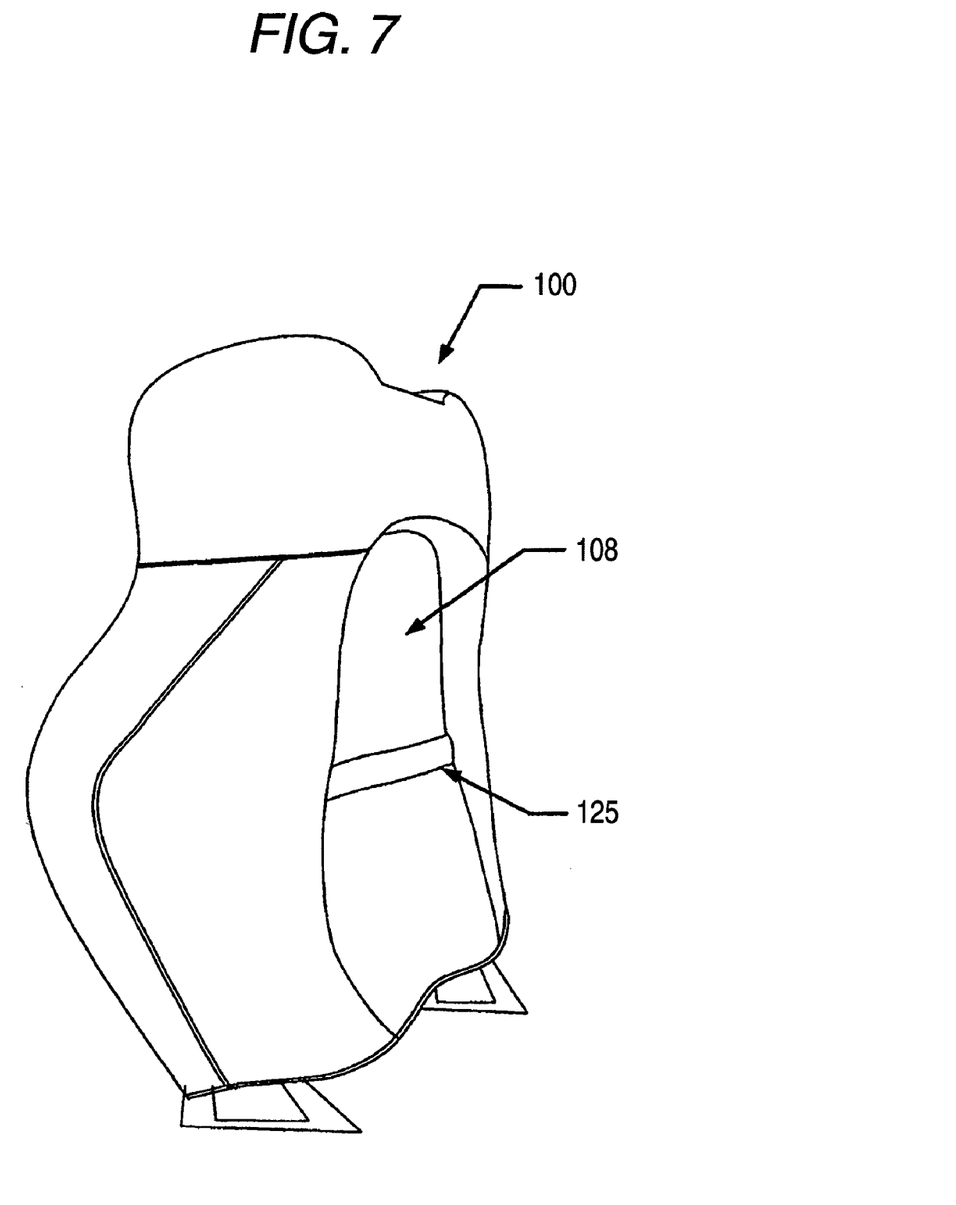
FIG. 7 illustrates a perspective view of the soft cover shown in FIG. 2.

In various embodiments, once the seat cover 100 is secured to the seat, the medial portion 108 is recessed relative to a plane extending through the first and second side portions 102, 103 and the upper portion 101. FIG. 7 provides a further illustration of the installed soft cover 100 displaying the recessed medial portion 108. In addition, in various embodiments, the medial portion 108 includes a pocket 125 on its outer surface, and the pocket 125 is pulled taunt once the soft cover 100 is secured to the seat.

CONCLUSION

Although this invention has been described in specific detail with reference to the disclosed embodiments, it will be understood that many variations and modifications may be effected within the spirit and scope of the invention as described in the appended claims.

The invention claimed is:

1. A soft cover for covering a seat having an inner frame, the soft cover having a rear portion comprising:
    a first side portion comprising an inner edge having a first set of one or more fasteners disposed thereon;
    a second side portion spaced apart from the first side portion, the second side portion comprising an inner edge having a second set of one or more fasteners disposed thereon;
    an upper portion disposed between the first side portion and the second side portion; and
    a flap portion disposed between the first side portion and the second side portion and below the upper portion, the flap portion comprising:
        a first flap portion edge adjacent the inner edge of the first side portion, the first flap portion edge having a first set of one or more mating fasteners;
        a second flap portion edge adjacent the inner edge of the second side portion, the second flap portion edge having a second set of one or more mating fasteners;
        an upper flap portion edge extending between upper ends of the first flap portion edge and the second flap portion edge; and
        a medial portion disposed between the first flap portion edge and the second flap portion edge, the medial portion comprising:
            a first medial portion edge adjacent and spaced apart from the first flap portion edge;
            a second medial portion edge adjacent and spaced apart from the second flap portion edge;
            an upper medial portion edge extending between upper ends of the first medial portion edge and the second medial portion edge;
            a first set of one or more hooks secured to an inner surface of the medial portion along the first medial portion edge, the first set of one or more hooks being configured to engage the inner frame of the seat; and
            a second set of one or more hooks secured to the inner surface of the medial portion along the second medial portion edge, the second set of one or more hooks being configured to engage the inner frame of the seat, wherein:
            the medial portion is configured to be recessed by:
                engaging the first and second sets of hooks with the inner frame of the seat;
                engaging the first set of one or more fasteners with the first set of mating one or more fasteners; and
                engaging the second set of one or more fasteners with the second set of one or more mating fasteners.

2. The soft cover of claim 1, wherein the hooks of the first and second sets of one or more hooks are J-hooks.

3. The soft cover of claim 2, wherein the first and second sets of one or more hooks form elongated J-hook configured to engage the inner frame of the seat.

4. The soft cover of claim 1, wherein the first and second sets of one or more hooks form elongated hook configured to engage the inner frame of the seat.

5. The soft cover of claim 1, wherein the first set of one or more fasteners and the first set of one or more mating fasteners comprise teeth configured to be engaged with a slide fastener.

6. The soft cover of claim 5, wherein slide fastener is a concealed slide fastener.

7. The soft cover of claim 1, wherein the second set of one or more fasteners and the second set of one or more mating fasteners comprise teeth configured to be engaged with a slide fastener.

8. The soft cover of claim 7, wherein the slide fastener is a concealed slide fastener.

9. The soft cover of claim 1, wherein the upper edge of the flap portion is integrally formed to the upper portion.

10. The soft cover of claim 1, wherein the upper edge of the flap portion is attached to the upper portion.

11. The soft cover of claim 1 wherein the seat is a back to a passenger seat for a car.

12. The soft cover of claim 1 wherein the medial portion has a pocket.

13. The soft cover of claim 1 wherein the medial portion further comprises a third set of one or more hooks secured to an inner surface of the medial portion along the upper medial portion edge, the third set of one or more hooks being configured to engage the inner frame of the seat, wherein:

the medial portion is configured to be recessed by:
engaging the first, second, and third sets of hooks with the inner frame of the seat;
engaging the first set of one or more fasteners with the first set of mating one or more fasteners; and
engaging the second set of one or more fasteners with the second set of one or more mating fasteners.

* * * * *